(12) United States Patent
Tate et al.

(10) Patent No.: US 12,007,330 B2
(45) Date of Patent: Jun. 11, 2024

(54) HIGH-TEMPERATURE OPTICAL PROBE

(71) Applicant: Dow Global Technologies LLC, Midland, MI (US)

(72) Inventors: James D. Tate, Freeport, TX (US); Paul J. Cammarata, Freeport, TX (US); R. Spencer Behling, Freeport, TX (US)

(73) Assignee: Dow Global Technologies LLC, Midland, MI (US)

( * ) Notice: Subject to any disclaimer, the term of this patent is extended or adjusted under 35 U.S.C. 154(b) by 210 days.

(21) Appl. No.: 17/419,462

(22) PCT Filed: Nov. 6, 2019

(86) PCT No.: PCT/US2019/059983
§ 371 (c)(1),
(2) Date: Jun. 29, 2021

(87) PCT Pub. No.: WO2020/142138
PCT Pub. Date: Jul. 9, 2020

(65) Prior Publication Data
US 2022/0074865 A1 Mar. 10, 2022

Related U.S. Application Data

(60) Provisional application No. 62/786,687, filed on Dec. 31, 2018.

(51) Int. Cl.
*G01N 21/85* (2006.01)
*G01N 21/03* (2006.01)
*G01N 21/05* (2006.01)

(52) U.S. Cl.
CPC ......... *G01N 21/8507* (2013.01); *G01N 21/05* (2013.01); *G01N 2021/0389* (2013.01);
(Continued)

(58) Field of Classification Search
CPC ....... G01N 21/8507; G01N 2021/8578; G01N 2021/0389; G01N 2021/052; G01N 2201/0233; G01N 2201/062
See application file for complete search history.

(56) References Cited

U.S. PATENT DOCUMENTS 9,304,079 B2 4/2016 Wang et al.
2012/0033219 A1 2/2012 Hokamura et al.
(Continued)

FOREIGN PATENT DOCUMENTS

WO 2004031742 A1 4/2004
WO 2015193370 A1 12/2015

OTHER PUBLICATIONS

Inernational Search Report & Written Opinion to corresponding PCT Application No. PCT/US2019/059983 dated Mar. 10, 2020.
(Continued)

*Primary Examiner* — Tarifur R Chowdhury
*Assistant Examiner* — Amanda Merlino
(74) *Attorney, Agent, or Firm* — Dinsmore & Shohl LLP (57) ABSTRACT

A probe body (12) in a optical probe (10) including a measurement tube (14) having a plurality of probe vents (16) adapted to allow process fluid to flow there through; two or more purge rings, each including a process window, a purge gas inlet, and a plurality of purge gas outlet openings adapted to direct purge gas toward or adjacent to the process window; and a measurement region defined by a portion of the measurement tube and two or more of the purge rings.

20 Claims, 4 Drawing Sheets

(52) U.S. Cl.
CPC .................. *G01N 2021/052* (2013.01); *G01N 2021/8578* (2013.01); *G01N 2201/0233* (2013.01); *G01N 2201/062* (2013.01)

(56) References Cited

U.S. PATENT DOCUMENTS

| | | |
|---|---|---|
| 2014/0211209 A1 | 7/2014 | Ido et al. |
| 2016/0216213 A1 | 7/2016 | O'Brien et al. |
| 2016/0258057 A1* | 9/2016 | Lee .................. H01L 21/67115 |

OTHER PUBLICATIONS

Saudi Arabian Office Action issued for related Saudi Arabian Patent Application No. 521422457 dated Dec. 20, 2022 (19 total pages).
Saudi Arabian 2nd Examination Report, dated Aug. 13, 2023, pertaining to Saudi Arabian Patent Application No. 521422457, 31 pgs.
Saudi Arabain Office Action dated Feb. 26, 2024, pertaining to SA Patent Application No. 521422457, 13 pgs.
Chinese Office Action and Search Report dated Feb. 8, 2024, pertaining to CN Patent Application No. 201980089722.X, 10 pgs.

\* cited by examiner

HIGH-TEMPERATURE OPTICAL PROBE

CLAIM OF PRIORITY

The present application is a National Stage Entry under 35 U.S.C. § 371 of International Patent Application No. PCT/US2019/059983, filed Nov. 6, 2019, which claims the benefit of priority to U.S. Provisional Application No. 62/786,687, filed on Dec. 31, 2018, the contents of which are incorporated by reference herein for all purposes.

FIELD

In general, the present teachings relate to an apparatus for measuring process gases. More particularly, the present teachings are directed to a probe and parts thereof for monitoring gases in high temperature environments.

BACKGROUND

Control of the environment where products are manufactured is a key element of good manufacturing practices. Monitoring of the environment is also critical for safety. Gas monitoring of a process is often necessary to help prevent an explosion or to prevent worker injury or exposure to toxic gases. Gas monitoring may also be used for process control.

Oxygen analyzers, for example, provide valuable measurements in combustion control, process quality, safety, and environmental applications. These are used in a variety of measurement scenarios including, but not limited to, in power plants, in refinery and petrochemical applications, in process safety, and in product quality in chemical production.

Different types of sensors can be used for measuring levels of oxygen (or other components) in a gas or mixture of gases. Exemplary sensors include zirconia oxygen analyzers, paramagnetic oxygen analyzers, and tunable diode laser (TDL) analyzers. However, current sensors or analyzers have disadvantages. Some apparatuses require a transmitter at one end and a receiver on the opposing end of a pipe or stack where the process gas is being measured. Requiring multiple pieces may complicate installation and maintenance. Current apparatuses may be compatible only at lower temperatures than desired. Some sensors can operate up to about 600° C., for example, but for processes above these temperatures, additional steps are required. The additional steps may also require large pieces of equipment. Auxiliary cooling may be needed, requiring cooling jackets and/or cooling fluids. These additional steps and equipment add significant cost, energy, and complexity to the process.

Notwithstanding efforts to improve monitoring and analyzing process gases, there remains a need for obtaining relevant, information-rich process data. There remains a need for field repairable and/or replaceable components or equipment. There is also a need for an assembly with components that are exchangeable and easily replaced, so an entire analyzer does not have to be replaced or so an entire process does not have to be shut down for long, if at all, for maintenance of the analyzer and its components. There remains a need for assemblies capable of operating at low temperatures and high temperatures and assemblies capable of withstanding temperature fluctuations. There is also a need for low utility consumption while measuring and analyzing process gases, particularly in applications of high temperatures. There remains a need to monitor process composition using a low-cost, reliable in-situ measurement device that does not require sample conditioning and can withstand harsh, high-temperature and high-pressure conditions.

SUMMARY

The present teachings make use of a simple, yet elegant, construction approach by which relatively few components can be employed for achieving probing of a process fluid to determine composition or to monitor particular elements within the process fluid.

The present teachings include a probe body. The probe body may include a measurement tube having a plurality of probe vents adapted to allow process fluid to be analyzed to flow therethrough. The probe body may include one or more purge rings. The purge rings may include a process window, a purge gas inlet, and a plurality of purge gas outlet openings adapted to direct purge gas toward or adjacent to the process window. The probe body may include a measurement region defined by a portion of the measurement tube and two or more of the purge rings. The probe body may be capable of withstanding temperatures up to and including about 1100° C. The probe body may be adapted to be used with a single-ended optical probe. The probe body may be adapted to be removably secured to a transmitter of an optical probe.

The measurement tube of the probe body may have probe vents aligned longitudinally and radially in rows and columns. The probe vents may be in a generally symmetric configuration (e.g., if a longitudinal plane bisects the measurement tube). The measurement tube may be formed of a material that is resistant to sag when exposed to high temperatures (e.g., up to and including about 1100° C.). The measurement tube may be formed of a material having a melting point of about 1150° C. or greater. The measurement tube may be formed of a material that is oxidation resistant to about 1100° C. or greater (e.g., about 1150° C.). The measurement tube may be formed of a nickel-based alloy, such as RA330.

The probe body may include one or more purge gas transport assemblies. The purge gas may be directed through the purge gas outlet openings. The purge gas outlet openings may be angled such that the purge gas is adapted to swirl about a surface of the process window.

The probe body may further include a retroreflector assembly located at an end of the probe body. The retroreflector assembly may include a retroreflector having two or more reflector walls adapted to redirect light emitted from a light source, such as a laser or LED. The retroreflector may be formed of a material capable of withstanding temperatures up to and including about 1100° C. The retroreflector may be formed of a material that is dissimilar from a material forming the measurement tube. The retroreflector may be formed of a material having a melting point of about 2000° C. or greater. The retroreflector may have a different thermal expansion coefficient from the measurement tube. The retroreflector may be formed of an aluminum oxide material. For example, the retroreflector may be formed of sapphire. The retroreflector assembly may include a clinch seal for holding the retroreflector in place. The clinch seal and retroreflector may each include an engagement feature for securing the retroreflector within the clinch seal. For example, the engagement features may include complementary shaped features, such as a cove and a bullnose shape.

The present teachings also contemplate an optical probe including the probe body as described herein and a transmitter. The transmitter may house one or more light sources and electronic elements. The optical probe or the probe body may be used for measuring and/or analyzing a process fluid. For example, the probe may be used to evaluate the composition of a fluid or determine the amount of a particular compound within the composition.

The present teachings also include a method including directing light in a first direction through a process window of the probe body into a measurement region and across a stream of process fluid to a retroreflector; reflecting the light via the retroreflector in an opposing direction in a generally parallel orientation to the first direction; and analyzing the composition of the process fluid. The method may further include pumping purge gas to one or more purge rings and directing the purge gas toward or adjacent to the process window via a plurality of purge gas outlet openings for cleaning the process window. Purge gas may flow through the probe body at about 2 L/min or less.

The present teachings therefore provide a probe body capable of isolation from a transmitter, which allows for replacement of the probe body. The probe body allows the ability to mount optical elements for measuring or determining a desired characteristic or component of a composition. The probe body is capable of withstanding high temperatures without significant sag or loss of mechanical integrity and/or withstanding a wide range of temperature variation.

The present teachings provide a lower-cost approach to probing a process fluid. The data obtained is information rich. It is possible to identify true operating conditions and allows for control of goals and constraints.

DETAILED DESCRIPTION

As required, detailed embodiments of the present teachings are disclosed herein; however, it is to be understood that the disclosed embodiments are merely exemplary of the teachings that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present teachings.

In general, and as will be appreciated from the description that follows, the present teachings pertain to a probe body for an optical probe, an optical probe, use of the probe body and/or optical probe, and methods of probing a process fluid to determine a composition or to monitor particular levels of a component of the composition. For example, the probe may be used to monitor the oxygen levels of a process fluid. Where the present application refers to fluids, it is contemplated that these fluids include gases.

The present teachings pertain to an optical probe and parts thereof for measuring and/or analyzing the composition of a process fluid. An optical probe may be used for measuring compositions or conditions within fired assets, such as large scale fired equipment (e.g., furnaces, boilers, thermal treatment units, flares, process heaters, and the like). An optical probe may find particular use in a furnace, such as for monitoring combustion gases in an olefins furnace. The present teachings may be employed for technologies that do not require HVAC shelters. The present teachings may be employed for use in technologies that do not need sample transport or that need reliable, simpler sample systems. As another example, the present teachings may be used for reactor monitoring or distillation tower monitoring.

The present teachings may provide cost savings as compared with other methods of measuring or analyzing process fluids, other probes, or parts thereof. The present teachings may provide a reliable apparatus and method for measuring or analyzing the fluids. The probe, or parts thereof, may allow for direct probing of the chemical signatures of the compounds of interest. The probe, or parts thereof, may provide information-rich data. The probe, or parts thereof, may identify true operating conditions. The probe, or parts thereof, may allow for control of the current goals or constraints based on the data collected. The probe, or parts thereof, may be able to withstand high temperatures (e.g., up to and including about 1100° C.). The probe, or parts thereof, may be able to withstand a wide range of temperature variation, thereby maintaining mechanical integrity, avoiding cracking of optical elements, or both. The temperature variations may be over a short period of time (e.g., minutes, hours).

In general, an optical probe in accordance with the present teachings may include a transmitter and a probe body. The probe body may include one or more purge rings for ensuring optical windows within the probe are kept clean, clear, and/or free of condensation or debris. The probe body may include a retroreflector for directing a light through the probe to enable the measurement or monitoring of the process fluid. The optical probe may be a single-ended optical probe. As such, the probe body may be inserted into a chamber or piece of equipment for measuring a desired condition (e.g., monitoring a particular compound or analyzing a chemical signature of a process fluid). The probe may, therefore, be in a cantilevered orientation. For example, the probe body may extend into the chamber or piece of equipment and may be held in place by or secured to a structure defining the chamber.

The optical probe may include a transmitter portion. The transmitter may include one or more light sources of the optical probe. The transmitter may include electronic components of the optical probe. The transmitter may include one or more light sources, such as one or more laser diodes or light-emitting diodes, one or more beam splitters, one or more photodiodes, or a combination thereof. The transmitter may include a main enclosure for housing the components of the transmitter. The transmitter may include an optics enclosure for housing optical components of the probe. The transmitter may include a plurality of ports. Ports may include any combination of validation gas ports, optics purge ports, cable ports, and the like. The transmitter may include one or more displays or screens (e.g., an LCD display, LED display, touchpad, or the like) for displaying conditions of the process, such as temperatures, pressure, and flow rate, compositions of the stream of fluid being analyzed, and the like. The transmitter may include one or more features for adjusting the transmitter, or components therein. For example, a feature (e.g., a beam alignment adjustment screw) may be employed for ensuring a light emitted from a source is properly oriented to achieve accurate readings.

The optical probe may include a probe body. The probe body may have at least a portion that is adapted to receive process gas. The probe body may be adapted to allow process fluid to flow therethrough. The probe body may have a measurement region where the process fluid flows through. Process fluid may flow in an angled relation to the longitudinal axis of the probe body. Process fluid may flow in a generally non-parallel direction to the longitudinal axis of the probe body. Process fluid may flow in a generally perpendicular direction to the longitudinal axis of the probe body.

The probe body may be secured to the transmitter. The probe body may be removable from the transmitter. The probe body may be capable of isolation from the transmitter. This may allow the probe body to be replaced, without also replacing the transmitter. This may allow for customization of the probe, depending upon the application, the size of the probe needed, the compositions being evaluated, the temperature to which the body will be exposed, or the like. The probe body may be retrofit onto an existing transmitter.

The probe body may be capable of withstanding high temperatures. The probe body may be capable of withstanding temperatures of about 400° C. or greater, about 600° C. or greater, about 800° C. or greater, or about 1000° C. or greater. The probe body may be capable of withstanding temperatures of about 1100° C. or less. The probe body, or parts thereof, may be made of any material capable of withstanding the temperatures to which it is exposed. The probe body or parts thereof may be capable of withstanding temperature fluctuations. The probe body or parts thereof may be capable of withstanding a temperature change from ambient temperature up to and including about 1100° C.

The probe body may include a measurement tube, one or more purge rings, one or more purge gas assemblies, one or more retroreflector assemblies, or a combination thereof. The probe body may allow for the ability to mount optical elements, such as windows and mirrors, so that data may be collected. The components of the probe body may allow for a process fluid to travel through the measurement tube in a defined area. The defined area may be bounded by one or more process windows, which are adapted to be kept clean, clear, free of or having reduced amounts of debris, free of or having reduced amounts of condensation, or a combination thereof, by a purge assembly, including one or more purge rings.

The measurement tube of the probe body may be a generally hollow structure or may have one or more generally hollow portions. The measurement tube may be generally cylindrical. The measurement tube may have a generally circular or oval cross-section. The measurement tube may have a cross-section having one or more generally straight segments. The measurement tube may have a cross-section with one or more generally curved segments. The measurement tube may have a generally consistent diameter (e.g., outer diameter) along at least a portion of its length. The measurement tube may have a varying diameter (e.g., outer diameter) along its length.

The measurement tube may function to enclose and/or protect other elements of the probe assembly. The measurement tube may enclose one or more lines for transporting purge gas. The measurement tube may have an inner diameter that is greater than the outer diameter of one or more other components of the assembly. For example, the outer diameter of one or more purge rings may be smaller than the inner diameter of the measurement tube so that the purge rings may be secured within the measurement tube. The measurement tube may be closed by a cap. The cap may act to define a purge region of the probe body. The cap may act to secure and/or protect other features within the measurement tube, such as a retroreflector assembly.

The measurement tube may be formed of a material that is capable of withstanding placement inside a high temperature process. The measurement tube may be able to withstand these temperatures and/or temperature fluctuations without significant sagging or drooping. The measurement tube may be formed of a material that may be resistant to sag when exposed to temperatures up to and including about 1100° C. The measurement tube may be formed of a material having a melting point of about 1100° C. or greater, or about 1150° C. or greater. The measurement tube may be oxidation resistant up to and including about 1150° C. The measurement tube may be formed of a metallic material. The measurement tube may be formed of a high temperature alloy. For example, the measurement tube may be formed of a nickel-based alloy (e.g., RA330) or a cobalt-based alloy.

The measurement tube may include a measurement region. The measurement region may be adapted to receive the process fluid to be measured or analyzed. The measurement region may be defined by one or more purge rings and the measurement tube.

The measurement tube (e.g., at the measurement region) may include a plurality of probe vents or openings for allowing the process fluid to flow into the measurement tube and out of the measurement tube. The positioning, number, and orientation of the vents may be selected to reduce or avoid sagging and/or stress that may occur at elevated temperatures. The probe vents may be generally the same size and/or shape. The probe vents may have different sizes and/or shapes relative to each other. The probe vents may have a generally elongated shape (e.g., a rectangle, stadium, or oval shape). The generally elongated shape may extend along the length of the measurement tube (e.g., in a longitudinal direction). A series of vents may be generally aligned along the length of the measurement tube (e.g., creating a row of vents). A series of vents may be generally aligned radially around the diameter of the measurement tube (e.g., creating a column of vents). The probe vents may be arranged generally continuously along the length or at least a portion of the length of the measurement tube. The probe vents may be arranged generally continuously around the measurement tube. The probe vents may be in generally symmetric configuration (e.g., if a longitudinal plane bisects the measurement tube). The probe vents may be located in generally opposing positions from each other (e.g., one or more probe vents adapted to receive the flow of the process fluid and one or more probe vents on the opposing portion of the measurement tube to allow the process fluid to exit the measurement region).

The probe body may contain one or more optical elements. The optical elements may act to define the measurement region. The optical elements may separate the process gas from other elements of the probe. The optical elements may be of a material capable of allowing transmission of light through the probe.

The optical elements may include one or more process windows. A process window may extend generally transverse to the longitudinal axis of the probe body. The process window may be located within probe body and may extend across at least a portion of the inner diameter of the measurement tube.

The optical elements, such as one or more process windows, may be made of a material capable of withstanding high temperatures. The material may be capable of withstanding temperatures of about 600° C. or greater, about 800° C. or greater, or about 1000° C. or greater. The material may be capable of withstanding temperatures up to and including about 1100° C., for example. The material may have a very wide optical transmission band. The material may be one that is highly transparent. For example, the material may be highly transparent to wavelengths of light from about 150 nm or greater. The material may be one that is highly transparent to wavelengths of light from about 5500 nm or less. For example, the material may have an optical transmission band from UV to near-infrared. The material may be scratch resistant. The material may be abrasion resistant. The material may have a mineral hardness of about 6 or greater, about 8 or greater, or about 9 or greater on the Mohs scale of mineral hardness. The material may be significantly stronger than other optical materials or standard glass windows. The material may include one or more anti-reflection features, layers, or coatings. Exemplary materials for the optical elements, such as one or more process windows, may include germanium, silicon, BK7, UV fused silica, zinc selenide, zinc sulfide, sapphire, calcium fluoride, magnesium fluoride, barium fluoride, sodium chloride, potassium bromide, and the like.

The probe body or probe as described herein may have two or more process windows. One process window may act to separate the components of the transmitter from the process fluid flowing through the measurement region of the measurement tube. One process window may be located at or near the free end of the probe body. A process window may act to separate a retroreflector assembly from the process fluid flowing through the measurement region of the measurement tube. One or more process windows may be associated with, surrounded by, or part of one or more purge rings.

One or more purge regions may be present within the optical probe. The purge regions may include one or more features for creating a curtain of purge gas in front of one or more optical elements (e.g., one or more process windows). The purge gas may act to isolate the optical elements from the process fluid. The purge regions, and associated purge components, may act to purge the optical elements that are exposed to process fluid to avoid, reduce, or remove accumulation of condensation or particulates that could compromise transmission of light through the probe. The purge regions, and associated purge components, may act to avoid the possibility of an explosive air/gas mixture existing or forming within the probe. The purge regions, and associated purge components, may avoid unstable mixing with the process fluid. Such unstable mixing with process fluid may lead to increased variability in the effective pathlength of the process fluid, which may lead to higher errors in the readings of the analyzer. Therefore, purging may provide a more accurate reading.

The probe body may include one or more purge gas assemblies. A purge gas assembly may include one or more tubes, channels, or pipes (referred to herein generally as tubes) for directing purge gas from a source of the gas to a portion or area of the probe body. The tubes or pipes may extend in a direction generally parallel to the longitudinal axis of the probe body. The purge gas assembly may be located in any area that does not interfere with the transmission of light or a laser beam within the probe. One or more tubes may be arranged at or near the inner diameter of the measurement tube. A plurality of tubes may be used. The number of tubes may correspond to the number of openings or inlets of a purge ring.

The purge gas assembly may act to transfer purge gas within the probe body. A purge gas may be any gas capable of purging optical elements that are exposed to process fluid to avoid, reduce, or remove accumulation of condensation or particulates that could compromise transmission of light through the probe. A purge gas may be any gas at a temperature that does not produce condensation on a surface of a process window. A purge gas may be any gas capable of acting to avoid the possibility of an explosive air/gas mixture existing or forming within the probe. For example, nitrogen gas or plant air may be used. The flow rate of the purge gas within the purge gas assembly may be controlled so as to conserve resources or reduce costs to operate. The purge gas may flow at about 5 L/min or less, about 3.5 L/min or less, or about 2 L/min or less.

The probe body may include one or more purge rings. The purge ring may act to guide purge gas to the purge region. The purge ring may have a periphery shape that generally matches the shape of the cross-section of the measurement tube. The purge ring may be generally ring shaped. The purge ring may have a generally circular outer diameter. The purge ring may have an opening therein. The opening may be located at or near the center of the purge ring. The opening may allow for alight emitted from alight source (e.g., laser, LED, or the like) to be directed through the probe body.

The purge ring may have an outer diameter that is smaller than the inner diameter of the measurement tube. The purge ring may be of a size and shape that fits within the measurement tube. The purge ring may be positioned at an angle relative to the longitudinal axis of the measurement tube. For example, the purge ring may be positioned or secured in a generally transverse direction to the longitudinal axis of the measurement tube. The purge ring may, for example, extend across the width of the measurement tube.

The purge ring may be generally hollow or may have one or more channels or cavities for receiving, directing, and/or accommodating purge gas. The channel or cavity may be defined by one or more pieces. A purge ring may include two pieces, for example. A purge ring may include a first ring, or an outer ring. A purge ring may include a second ring, or an inner ring.

The first ring may have a generally planar face surface. The face surface may be a ring-shaped face surface. One or more outer walls may extend from the outer edge of the ring-shaped face surface. The outer wall may extend around the periphery of the ring-shaped face surface at an angle from the face surface. For example, the outer wall may extend in a generally orthogonal direction in relation to the face surface. The ring-shaped face surface may have one or more openings for receiving purge gas (e.g., via one or more tubes).

The second ring may have a generally planar face surface. The face surface may be a ring-shaped face surface. One or more inner walls may extend from the inner edge of the ring-shaped face surface (e.g., the edge defining the opening of the ring). The inner wall may extend around the inner edge of the ring-shaped face surface at an angle from the face surface. For example, the inner wall may extend in a generally orthogonal direction in relation to the face surface. The ring-shaped face surface may have one or more openings for receiving purge gas (e.g., via one or more tubes).

In an assembled position, the ring-shaped face surfaces of the first ring and the second ring may extend in generally parallel planes in relation to each other. The ring-shaped face surfaces of both the first and second rings may be generally the same shape and size. The openings of the ring-shape face surfaces for receiving purge gas may be generally aligned. The outer wall of the first ring may extend toward the second ring. The inner wall of the second ring may extend toward the first ring. When the first and second ring are joined, a cavity may be formed for accommodating purge gas, defined by the inner wall, outer wall, and two ring-shaped face surfaces.

The purge ring may be located adjacent to or may include a process window. The process window may be received within the inner opening defining the ring shape. The process window may be accessible via the inner opening defining the ring shape.

The purge ring may include one or more features for directing purge gas on or near the process window. The purge ring may include one or more purge gas inlets. The purge gas inlet may receive a portion of a purge gas assembly (e.g., a tube). The purge ring may be generally hollow to accommodate purge gas.

The purge ring may include one or more purge gas outlets. The purge ring may include a plurality of purge gas outlets. The purge gas outlets may be positioned on the inner wall defining the ring shape. The purge gas outlets may be canted or angled openings. The outlets may be angled toward the process window. The outlets may be angled inwardly (e.g., toward the center of the process window). The purge gas outlets may be situated such that a helical flow or swirl is created across the process window. The purge gas may flow from the purge ring without diluting the process sample, without affecting the path length of the light source or laser, or both.

The probe body may include a retroreflector assembly. The retroreflector assembly may be positioned toward the free end of the probe body (e.g., at the end of the probe body opposite the transmitter. The retroreflector assembly may function to reflect or redirect a light or laser beam (e.g., back toward the direction or generally parallel to the direction from which it originated).

The retroreflector assembly may include a retroreflector. The retroreflector may include one or more reflective surfaces. The retroreflector may include one or more reflector walls forming a tip. The retroreflector may have a tip that is generally conical. The retroreflector may have two or more walls that join together to form a point. The retroreflector may be a cube-corner retroreflector. One or more of the walls may be generally flat. One or more of the walls may be generally curved. The walls may be oriented such that a laser beam or light is able to be reflected or redirected to a desired location.

The retroreflector may be formed of a material capable of withstanding high temperatures. For example, the retroreflector may be able to withstand temperatures of about 600° C. or greater, about 800° C. or greater, about 1000° C. or greater. For example, the retroreflector may be able to withstand temperatures of about 1100° C. or less. The material may have a melting point about 1150° C. or greater, about 1500° C. or greater, or about 2000° C. or greater. The retroreflector material may have a coefficient of thermal expansion of about $(5.0-6.6) \times 10-6/K$. The material may be non-flammable. The material may be an aluminum oxide material. For example, the retroreflector may be formed of sapphire. The retroreflector may be formed of a different material than the measurement tube. The retroreflector may be at least partially formed of the same material as the measurement tube. The retroreflector may be formed of a material having a different thermal expansion coefficient from that of the measurement tube. Therefore, care must be taken to ensure the mismatch does not result in significant mechanical stress that could compromise the probe (e.g., by cracking of the retroreflector or misalignment of the retroreflector).

The retroreflector may include a body portion from which the one or more walls extend. The body portion may have a shape that is able to be received within a securing portion of the retroreflector assembly, such as a clinch seal. For example, the body portion may be generally cylindrical. The body portion may be generally hollow or of a material that does not prevent or inhibit a light or laser beam from reaching one or more reflector walls.

The retroreflector assembly may include one or more clinch seals. The clinch seal may act to hold the retroreflector in place. The clinch seal may be formed of a different material from the retroreflector. The clinch seal may accommodate the mismatch of thermal expansion coefficients of the retroreflector material and mounting material. The clinch seal may allow for stable mounting of the retroreflector while the expansion and/or contraction of the mounting material changes as a function of temperature. The clinch seal may secure the retroreflector within the probe body. The clinch seal may have an outer shape that may be received within the measurement tube of the probe body. The clinch seal may have an inner opening adapted to receive a portion of the retroreflector (e.g., the body portion). The inner opening of the clinch seal may be generally complementary to the shape of the body portion received therein. The clinch seal may be formed of one or more pieces. The clinch seal may be formed of two or more pieces. Multiple pieces may be secured together (e.g., via laser welding).

The body portion of the retroreflector may have one or more features for securing the retroreflector within the retroreflector assembly and/or within the probe body. The clinch seal may have one or more features for securing the retroreflector within the retroreflector assembly and/or within the probe body. The body portion and the clinch seal may have generally complementary features for securing the parts together. One part may include a projection and the other part may include a cavity for receiving the projection. The projection may be generally bullnose shaped. The cavity may be a groove or cove. As an example, the clinch seal may have a bullnose shaped projection extending around at least a portion of the inner opening where the body portion of the retroreflector is to be received. The body portion of the retroreflector may have a cove or groove extending around at least a portion of the body portion. There may be sufficient tolerances of the securing features to allow for thermal expansion of the dissimilar materials.

The retroreflector assembly may include or may be located adjacent to one or more purge rings and/or process windows, as described herein. The purge ring and/or process window may act to separate the retroreflector from the process gas without hindering the path of the laser or light to and from the retroreflector.

The optical probe or parts thereof may be used for measuring or analyzing the composition of a process fluid or analyzing certain characteristics, compounds, or amounts, of a process fluid. The transmitter may contain optical elements of the probe. The probe may include alight-emitting device. The light-emitting device may emit light having a wavelength of about 10 nm or greater, about 240 nm or greater, or about 360 nm or greater. The light-emitting device may emit light having a wavelength of about 1000 nm or less, about 975 nm or less, or about 950 nm or less. For example, one or more laser diodes may be used to emit a laser beam. Another example includes a light-emitting diode. The probe may include a beam splitter, which may split the light in two or more directions. The light may extend through the body of the probe. A portion of the light that is split may be redirected to a reference cell. The reference cell may, for example, be used for laser frequency stabilization. The light may be transmitted to one or more reflector walls of the retroreflector. The reflector walls may act to modify the direction of the laser beam. The light may be redirected from one reflector wall to another reflector wall and may be redirected back toward the transmitter. Therefore, the light may be transmitted from the light emitting device in one direction. The light may then be redirected to a generally opposing direction. For example, one or more reflector walls may direct the light in an opposing direction that is generally parallel to the first direction of the beam of light.

In general, the optical probe as described herein is able to convert light rays or laser beams into electronic signals. The physical quantity of light is measured and translated into a form that is readable by an instrument. In measuring the light as it passes through the process fluid, components of the process fluid or levels of particular components are able to be determined.

Figure 1:
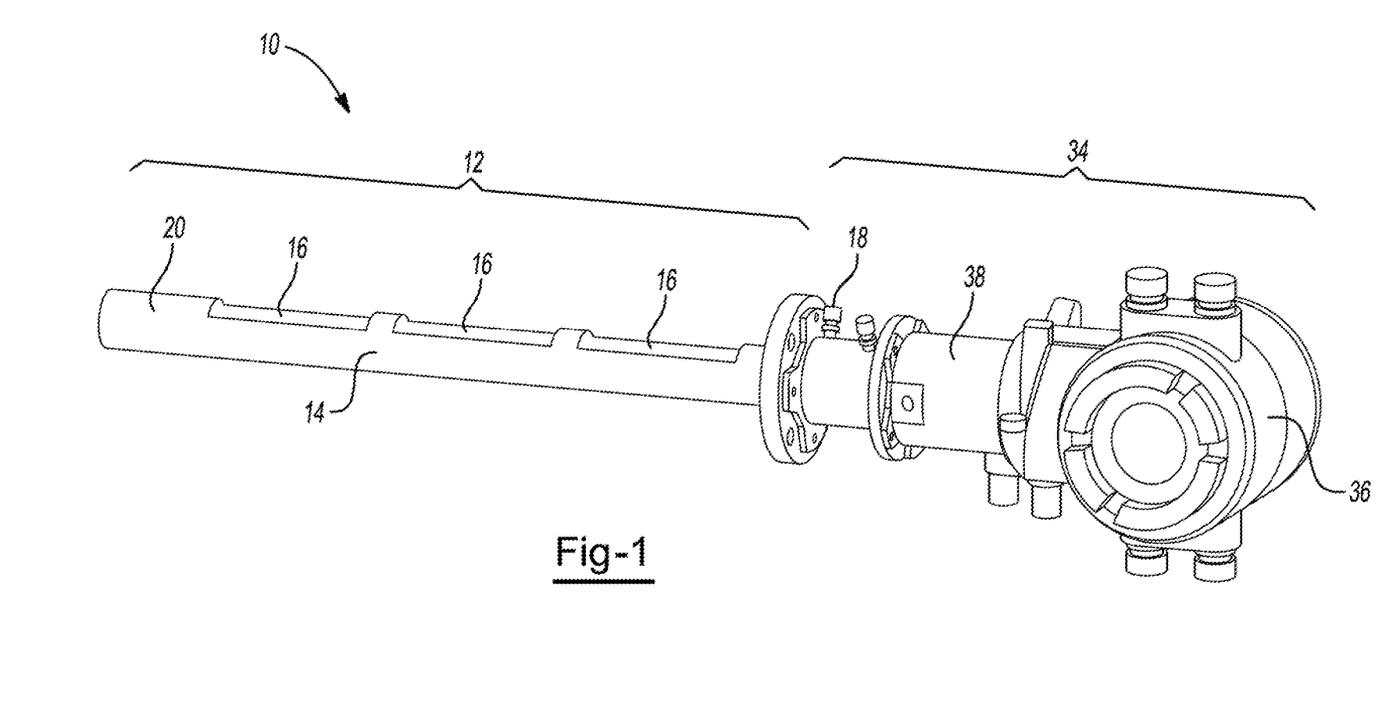
FIG. 1 illustrates an exemplary optical probe in accordance with the present teachings.

Turning now to the figures, FIG. 1 illustrates an exemplary optical probe 10. The probe 10 includes a probe body 12 and a transmitter 34. The probe body 12 includes a measurement tube 14, through which process fluid to be analyzed enters and exits via probe vents 16. At the tip of the optical probe 10 is a retroreflector assembly 20 that reflects the light from the transmitter 34 back to the transmitter. As purge gases may be used to ensure parts of the assembly remain clean, a purge port 18 is located on the optical probe 10 where purge gas enters or exits. The transmitter 34 includes a main enclosure 36 and an optics enclosure 38. These enclosures house electronics and light sources of the probe.

Figure 2:
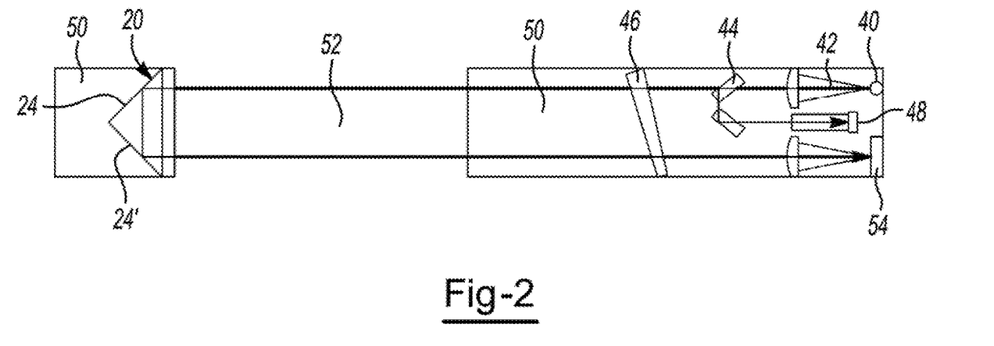
FIG. 2 illustrates an optical configuration of an optical probe in accordance with the present teachings.

FIG. 2 illustrates the optical configuration of an optical probe. A light source 40 projects light 42 into the body of the probe. The light is directed toward a beam splitter 44, where a portion of the light beam continues through a process window 46 and a portion of the light beam is directed toward a reference cell 48. The light beam continuing through the process window 46 extends through a purged region 50 into a measurement region 52 and then into another purged region 50. As the light 42 reaches a retroreflector assembly 20 at the end of the probe, the beam is redirected via reflector wall 24 and reflector wall 24' toward the opposite end of the probe to a photo diode 54.

Figure 3A:
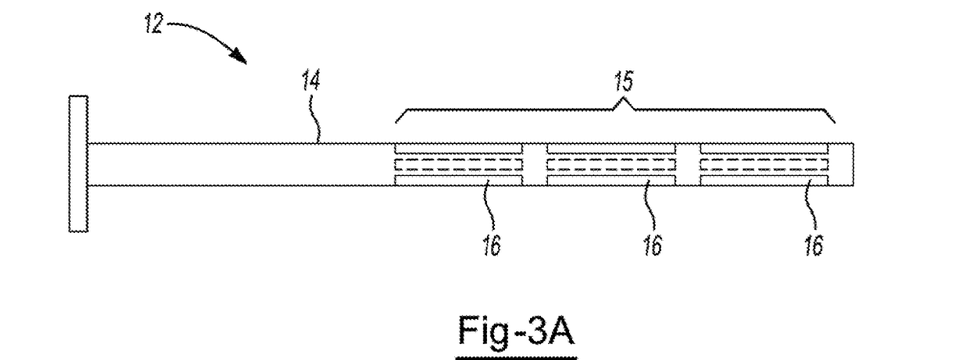
FIG. 3A illustrates an exemplary measurement tube of an optical probe in accordance with the present teachings.
Figure 3B:
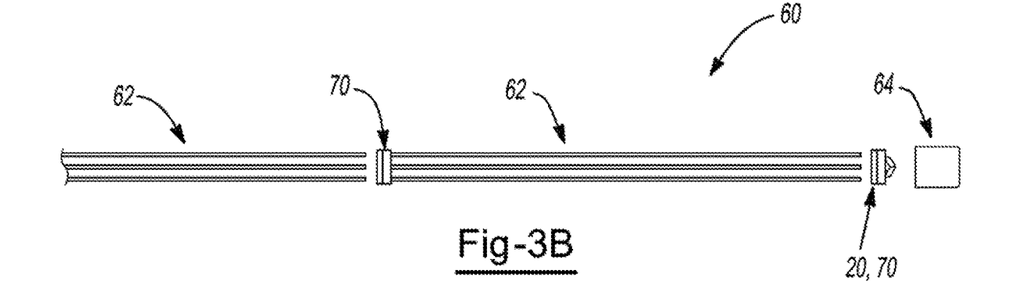
FIG. 3B illustrates an exemplary purge assembly in accordance with the present teachings.

FIGS. 3A and 3B illustrate an exemplary probe body 12, including a measurement tube 14 (FIG. 3A) and the components located within the measurement tube (FIG. 3B). The measurement tube 14, as shown in FIG. 3A includes a measurement region 15 having a plurality of probe vents 16 for the inlet and outlet of process fluid. For purposes of this figure, process fluid flows into the page, through the probe vents 16. As shown, the probe vents 16 are symmetric to avoid sagging and stress that may occur at elevated temperatures. The size of the vents may depend on the gases to be analyzed, the equipment within which the probe is situated, the size of the probe, the temperatures to which the probe is to be exposed, and the like. The measurement tube 14 has a generally hollow body, which allows the process fluid to flow therethrough.

The measurement tube 14 also accommodates the purge assembly 60 of FIG. 3B. The purge assembly 60 includes a purge gas transport assembly 62, which allows the purge gas to travel within channels within measurement tube to the areas to be cleaned by the purge gas. The purge gas exits the channels at one or more purge rings 70, where the purge gas acts to purge the optical elements of the probe that are exposed to process fluid to avoid accumulation of condensation, particulates, and the like, that may compromise transmission of light through the probe. A purge cap 64 is located at the end of the probe for closing the end of the measurement tube 14 and protecting a retroreflector assembly 20 and purge ring 70.

Figure 4:
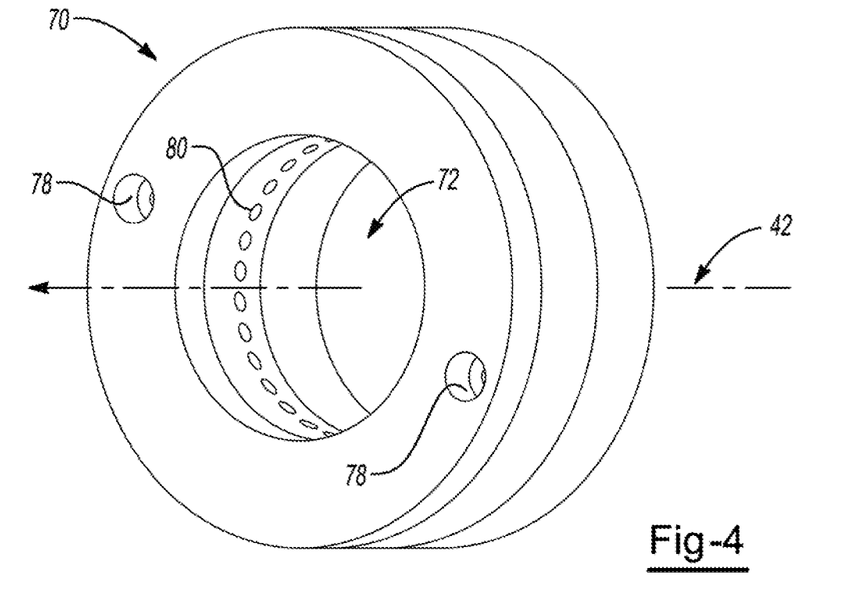
FIG. 4 illustrates an exemplary purge ring assembly in accordance with the present teachings.

FIG. 4 illustrates an exemplary purge ring 70. A process window 72 is located within the ring, and light 42, such as a laser beam or other light emitted from a source, travels therethrough. The purge ring 70 includes one or more purge gas inlets 78, through which purge gas is permitted to travel. The purge gas exits the ring at a plurality of purge gas outlets 80. The purge gas exits the purge gas outlets 80 in a generally helical or swirling fashion to purge the process window 72 to keep it clear so light 42 emitted from a light source is able to travel therethrough.

Figure 5:
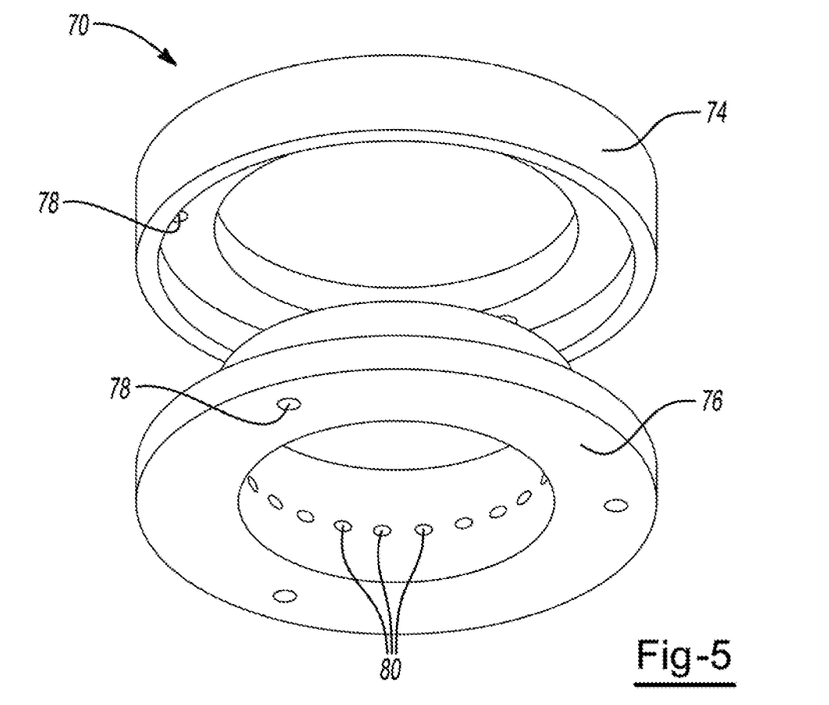
FIG. 5 illustrates an exploded view of an exemplary purge ring assembly in accordance with the present teachings.

FIG. 5 illustrates an exploded view of an exemplary purge ring 70. The purge ring 70 includes two parts, an outer ring 74 and an inner ring 76. Both the outer ring 74 and inner ring 76 include one or more purge gas inlets 78 for guiding the process fluid to the purge gas outlets 80 located on the inner ring 76. The inner ring 76 has a portion that extends and fits within the outer walls defining the outer ring 74. When assembled, a chamber is formed between the outer ring 74 and inner ring 76 for containing the purge gas and directing it through the purge gas outlets 80.

Figure 6A:
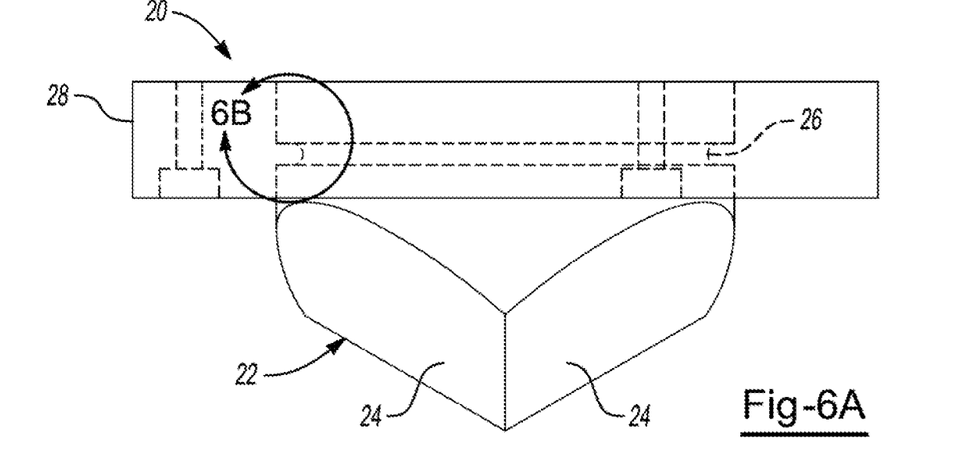
FIG. 6A illustrates an exemplary retroreflector assembly in accordance with the present teachings.
Figure 6B:
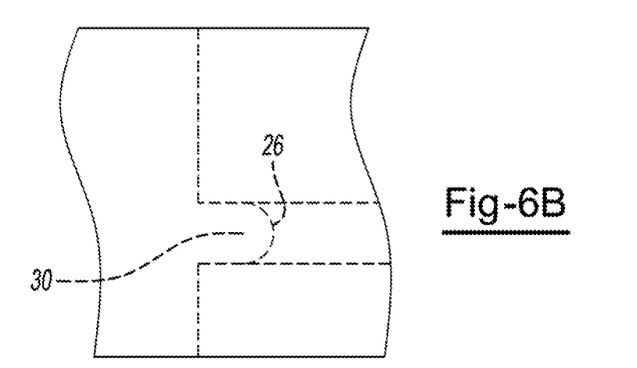
FIG. 6B illustrates an enlarged view of a portion of the retroreflector assembly of FIG. 6A.

FIGS. 6A and 68 illustrate an exemplary retroreflector assembly 20. The assembly includes a retroreflector 22, shown as a cube-corner retroreflector, having two or more reflector walls 24 forming a tip. The reflector walls act to reflect and redirect the light within the probe, so the light is directed back toward the photo diode 54 (see FIG. 2). The retroreflector 22 is secured within a clinch seal 28, with each having a feature that allows the components to be joined together (e.g., complementary features). As an example, the retroreflector 22 includes a cove 26 or channel adapted to receive a projection or bullnose portion 30 of the clinch seal 28.

Figure 7:
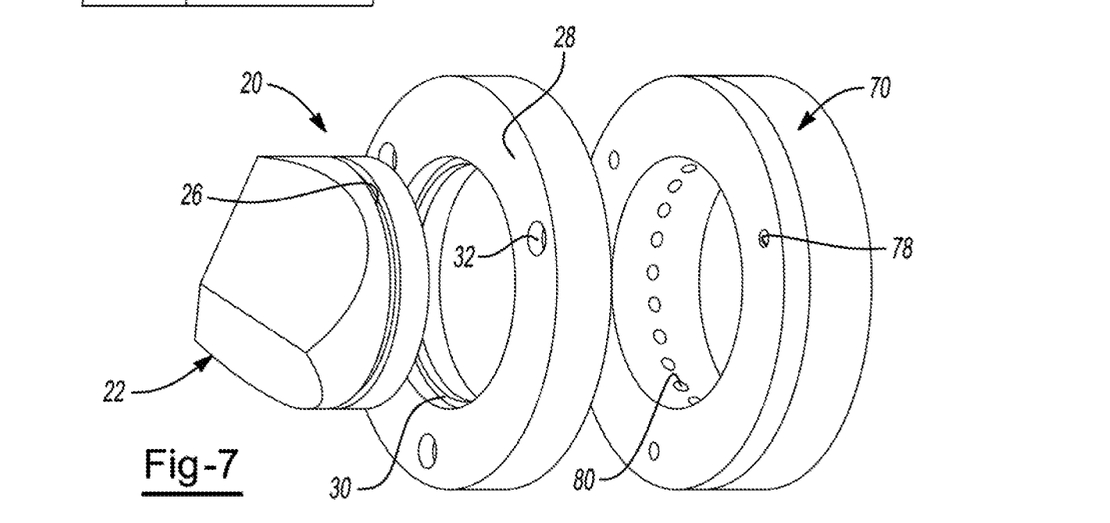
FIG. 7 illustrates an exploded view of a retroreflector assembly and purge ring in accordance with the present teachings.

FIG. 7 illustrates an exploded view of a retroreflector assembly 20 and a purge ring 70. The retroreflector 22 is adapted to be located within an opening of the clinch seal 28. The cove 26 of the retroreflector 22 receives the bullnose portion 30 of the clinch seal to secure the retroreflector within the assembly. The clinch seal 28 includes a plurality of purge gas inlets 32, which align with purge gas inlets 78 of the purge ring 70, thereby allowing purge gas to travel through the assembly and exit through the purge gas outlets 80. The purge ring 70 and purge gas keep the optical elements clear of debris, condensation, and the like, so the light is able to properly reach and reflect off of the retroreflector.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially or" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of, or even consisting of, the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

Relative positional relationships of elements depicted in the drawings are part of the teachings herein, even if not verbally described. Further, geometries shown in the drawings (though not intended to be limiting) are also within the scope of the teachings, even if not verbally described.

What is claimed is:

1. A probe body comprising:
   a. a measurement tube having a plurality of probe vents adapted to allow process fluid to flow therethrough;
   b. two or more purge rings, each comprising:
      i. a process window;
      ii. a purge gas inlet;
      iii. a plurality of purge gas outlet openings adapted to direct purge gas toward or adjacent to the process window;
      iv. an inner ring and an outer ring, wherein the inner ring comprises a portion that extends and fits within an outer wall of the outer ring; and
   c. a measurement region defined by a portion of the measurement tube and the two or more of the purge rings;
   wherein the probe body is capable of withstanding temperatures up to and including about 1100° C.; and
   wherein the probe body is adapted for insertion into a chamber or piece of equipment for measuring a desired condition.

2. The probe body of claim 1, wherein the probe body is adapted to be used on a single-ended optical probe.

3. The probe body of claim 1, wherein the probe body is adapted to be removably secured to a transmitter of an optical probe.

4. The probe body of claim 1, wherein the probe vents are aligned longitudinally and radially in rows and columns.

5. The probe body of claim 1, wherein the measurement tube is formed of a material resistant to sag when exposed to temperatures up to and including about 1100° C.

6. The probe body of any of claim 1, wherein the measurement tube is formed of a material having a melting point of about 1150° C. or greater.

7. The probe body of claim 1, wherein the purge gas outlet openings are angled such that the purge gas is adapted to swirl about a surface of the process window.

8. The probe body of any of claim 1, wherein the probe body further comprises a retroreflector assembly located at an end of the probe body.

9. The probe body of claim 8, wherein the retroreflector assembly comprises a retroreflector having two or more reflector walls adapted to reflect and/or redirect a light beam and wherein the retroreflector is formed of a material capable of withstanding temperatures up to and including about 1100° C.

10. The probe body of claim 9, wherein the retroreflector is formed of a material that is dissimilar from a material forming the measurement tube.

11. The probe body of claim 9, wherein the retroreflector is formed of an aluminum oxide material.

12. The probe body of claim 8, wherein the retroreflector assembly comprises a clinch seal for holding the retroreflector in place.

13. The probe body of claim 12, wherein the clinch seal and retroreflector each include an engagement feature for securing the retroreflector within the clinch seal.

14. The probe body of claim 13, wherein the engagement features include a cove and bullnose feature.

15. An optical probe comprising:
   a. a transmitter; and
   b. the probe body of claim 1.

16. A method comprising:
   a. directing light in a first direction through the process window of the probe body of claim 1 into the measurement region and across a stream of process fluid to a retroreflector;
   b. reflecting the light via the retroreflector in an opposing direction in a generally parallel orientation to the first direction;
   c. pumping the purge gas to one or more of the two or more purge rings;
   d. directing the purge gas toward or adjacent to the process window via the plurality of purge gas outlet openings for cleaning the process window; and
   e. analyzing the composition of the process fluid.

17. The method of claim 16, wherein the purge gas flows through the probe body at about 2 L/min or less.

18. The probe body of claim 1, wherein an outer diameter of the two or more purge rings is less than an inner diameter of the measurement tube.

19. The probe body of claim 1, wherein the purge gas inlet is disposed on a ring shaped face of the purge rings.

20. The probe body of claim 1, wherein:
the purge gas inlet and the plurality of purge gas outlet openings are disposed on the inner ring.

* * * * *